(12) United States Patent
Kato

(10) Patent No.: US 6,292,376 B1
(45) Date of Patent: Sep. 18, 2001

(54) SWITCHING POWER SUPPLY

(75) Inventor: Dai Kato, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/638,462

(22) Filed: Aug. 14, 2000

(30) Foreign Application Priority Data

Sep. 2, 1999 (JP) .................................................. 11-248704
Jun. 2, 2000 (JP) .................................................. 12-165719

(51) Int. Cl.[7] ................................................ H02M 3/335
(52) U.S. Cl. ................................ 363/21.09; 363/21.01
(58) Field of Search ................................ 363/21, 95, 97, 363/131; 323/222, 275, 285

(56) References Cited

U.S. PATENT DOCUMENTS 5,440,473 * 8/1995 Ishii et al. ................................ 363/21
6,028,776 * 2/2000 Ji et al. ................................... 363/15

* cited by examiner

Primary Examiner—Rajnikant B. Patel
(74) Attorney, Agent, or Firm—Moonray Kojima

(57) ABSTRACT

An improved switching power supply which saves power when under a small to no load, wherein a transformer is provided comprising a primary winding to which a DC current is supplied by turning ON and OFF a switching device and a secondary winding for supplying an output signal to the load; an ON state control circuit turns ON the switching device by using the output signal induced at the secondary winding; an OFF state control circuit turns OFF the switching device using a current control signal obtained from the output signal from the secondary winding and a reference signal; and wherein a delay circuit prolongs the time at which the switching device makes the OFF to ON transition.

4 Claims, 7 Drawing Sheets

SWITCHING POWER SUPPLY

BACKGROUND OF THE INVENTION

1. Field of Invention

This invention relates to an improved switching power supply which saves power under a small load to a no load condition.

2. Description of the Prior Art

A conventional switching power supply is shown in FIG. 1 and comprises a transformer TR including a primary winding L1 and a secondary winding L2; a magnetic flux detector 10; a current loop circuit 40 for controlling a DC current applied to the primary winding L1; a feedback circuit 30 for detecting and feeding an output voltage supplied to a load Z, on the secondary winding L2 side, back to the current loop circuit 40; and a secondary circuit 20 for supplying a voltage from the secondary winding L2 to the load Z.

The magnetic flux detector 10 includes a first comparator TRCMP, wherein a magnetic flux energy accumulated in the transformer TR is detected as a voltage signal by means of a current I2 flowing through the secondary winding L2 and a resistor R1, and to which the voltage signal and a reference voltage Vt1 are applied; and a first flip flop circuit FF1, wherein the output signal V6 from the first comparator TRCMP is inputted to the set terminal S; a gate signal V2 for a switching device SW is inputted to the reset input terminal R; and an output signal V7 from the output terminal Q of the first flip flop circuit FFL is connected to the set input terminal S of the second flip flop circuit FF2, discussed hereinafter.

The secondary circuit 20 includes the secondary winding L2 of transformer TR; a rectifying diode D connected in series to the secondary winding L2; a capacitor C connected in parallel to the secondary winding L2; and a load Z connected in parallel to the capacitor C. The feedback circuit 30 is located on the output load side, where a voltage applied to the load Z and a reference voltage Vt2 are inputted to the feedback circuit 30 in order to negatively feed back a current control signal V4 from an error amplifier EA, which outputs the current control signal V4, to a second comparator CSCMP so that a given output voltage is maintained.

The current loop circuit 40 includes the second comparator CSCMP wherein a current L1 flowing through the primary winding L1 is detected by means of a resistor R2 and the resulting voltage signal V3 is inputted to the non-inverting input terminal and the current control signal V4 from the feedback circuit 30 is inputted to the inverting input terminal; the second flip flop circuit FF2 wherein the output signal V5 of the second comparator CSCMP is inputted to the reset input terminal R; the output signal V7 of the first flip flop circuit FF1 is inputted to the set input terminal S and the output signal V2 of the output terminal Q is inputted to the gate of the switching device SW; and the switching device SW is turned ON and OFF by means of the output signal V2 from the second flip flop circuit FF2. The switching device SW is connected in series to the primary winding L1 of the transformer TR to control the current L1 flowing through the primary winding L1.

The switching power supply of FIG. 1 is operated as follows, with reference to the timing chart of FIG. 2, wherein the current L1 (voltage signal V3) flowing through the switching device SW, for applying a voltage to the primary winding L1, reaches the current control signal V4; the output signal V5 of the second comparator CSCMP changes to a high state and the output V2 of the second flip flop circuit FF2 is changed from a high state to a low state to turn OFF the switching device SW. That is, the switching device SW remains turned ON until the current flowing through the switching device SW reaches the current control signal V4, so that magnetic flux energy is accumulated in transformer TR.

When the switching device SW is turned OFF, the magnetic flux energy accumulated in transformer TR is supplied to the load Z through the secondary winding L2, rectifying diode D, etc, as a load current.

When the magnetic flux energy in the transformer TR becomes depleted, as time lapses, the voltage of the secondary winding L2 drops rapidly to fall below the reference voltage Vt1. Thus, the output signal V6 of the first comparator TRCMP goes low and the output signal V7 of the first flip flop circuit FFL goes high, thereby causing the output signal V2 of the second flip flop circuit FF2 to be changed to a higher state. This in turn causes the switching device SW to be turned ON. If the switching device SW is turned ON, the current I1 flowing through the switching device SW (i.e. voltage signal V3) continues to rise until the current again reaches the current control signal V4 level. In this manner, the switching power supply repeats the above operation to sustain self excited oscillation.

This means that the self excited oscillation in the conventional switching power supply is based on the mechanism wherein energy accumulated in the transformer TR is controlled by switching ON and OFF, the switching device SW to the difference between the voltage detected on the secondary winding L2 side and the reference voltage Vt1

In the described switching power supply, the current supplied to the load is, in principle, inversely proportional to the oscillation frequency. This is because the energy exchanged with the transformer TR at each cycle is also reduced when the amount of current supplied to the load is decreased, thereby resulting in a shorter time interval at which the switching device SW is turned ON and OFF. When the ON-OFF time interval of the switching device SW is shortened, the frequency of self excited oscillation is increased. This could cause such problems as power loss in the switching device SW, core loss in the transformer TR, increase in noise, and failure in oscillation. An excess increase in the oscillation frequency thus must be avoided. For this purpose, the minimum load is fixed using a bleeder resistor in some cases. This could also cause a problem, namely, that the power consumption then is increased even when the load is small or there is no load at all, since increases in the above discussed losses and other losses result from the frequency increases. Consequently, in the convention apparatus, it is difficult to reduce power consumption.

Moreover, in the art, the unresolved problem is how to prevent the ON-OFF time interval of the switching device SW from becoming shortened more or less under a small load to no load condition, and thereby avoid any excess increase in the frequency of self-excited oscillation.

An unsatisfactory attempt to resolve the above problem is shown in FIG. 3, wherein attempt was made to prevent an increase in switching frequency by providing the switching power supply with an oscillator for outputting a fixed frequency pulse signal, that is high state and low state pulses, as ON-OFF signals, rather than using a magnetic flux detector 10 of FIG. 1. Further power saving is required, however, even when the switching power supply is under a small load condition or a no load condition.

SUMMARY OF THE INVENTION

An object of the invention is to overcome the aforementioned and other deficiencies and problems of the prior art.

The foregoing and other objects are attained in the switching power supply of the invention, wherein delay circuit means are provide for prolonging the time at which the switching device makes the OFF to ON transition. In an illustrative embodiment, the delay circuit comprises a comparator having a hysteresis characteristic and a gate circuit for determining priority of signals applied to a set input terminal and a reset input terminal of a flip flop so as to suitably control the switching device. By such control, the switching power supply of the invention saves power when the load is small or no load condition exists.

DETAILED DESCRIPTION OF THE PREFERRED EMBODIMENTS

Figure 1:
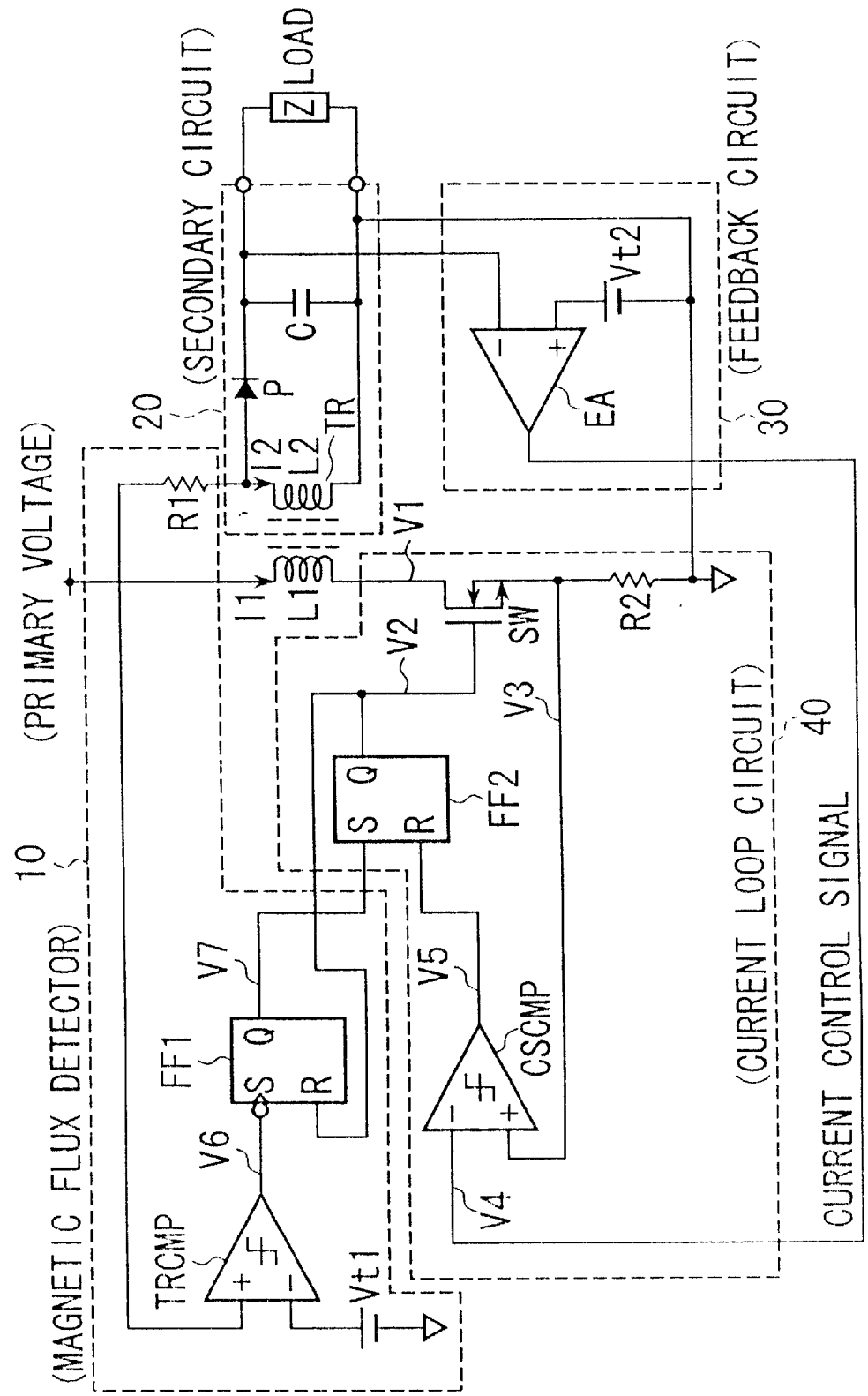
FIG. 1 is a diagram depicting a conventional switching power supply.
Figure 2:
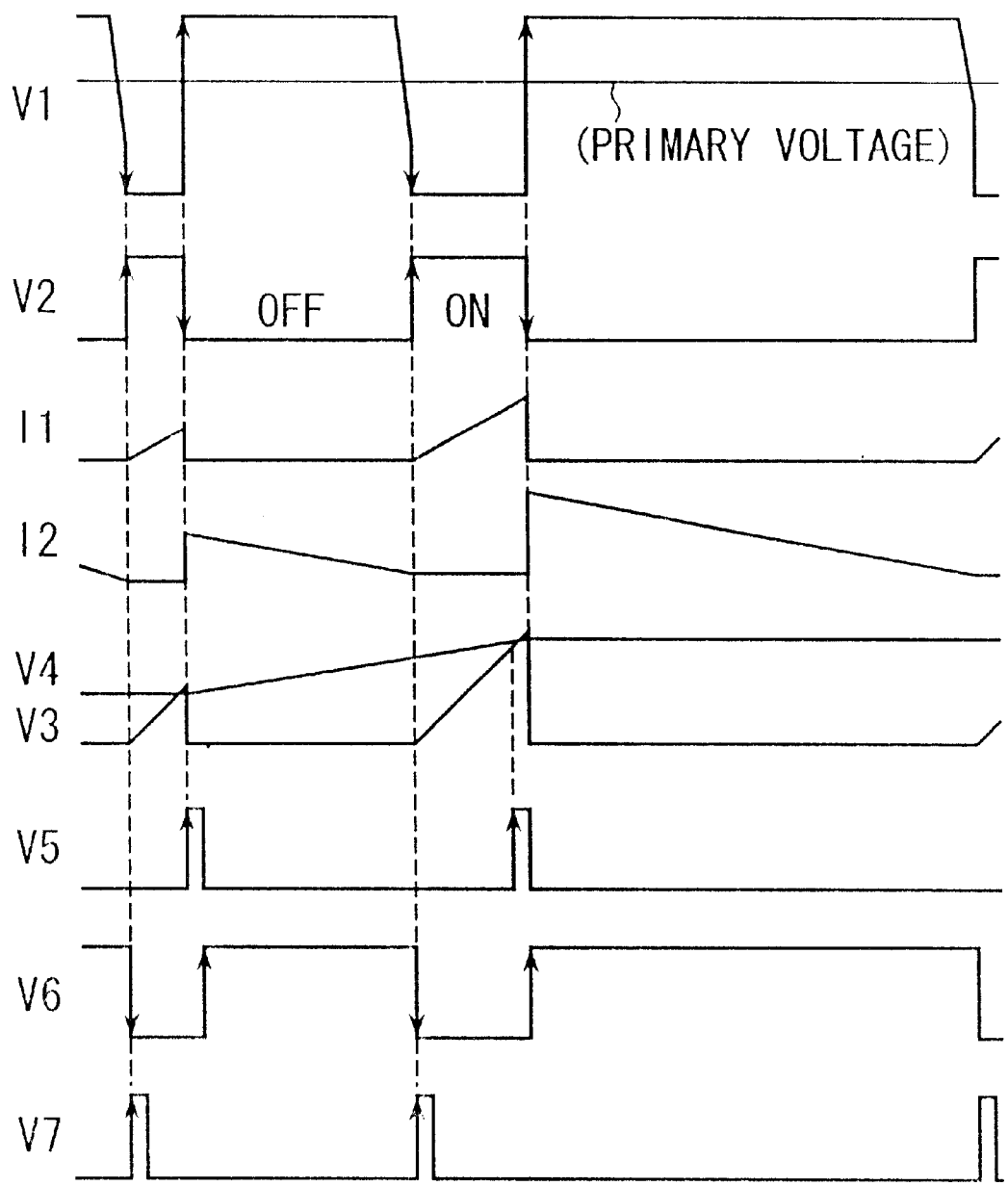
FIG. 2 is a timing chart depicting behavior of components of the apparatus of FIG. 1.
Figure 3:
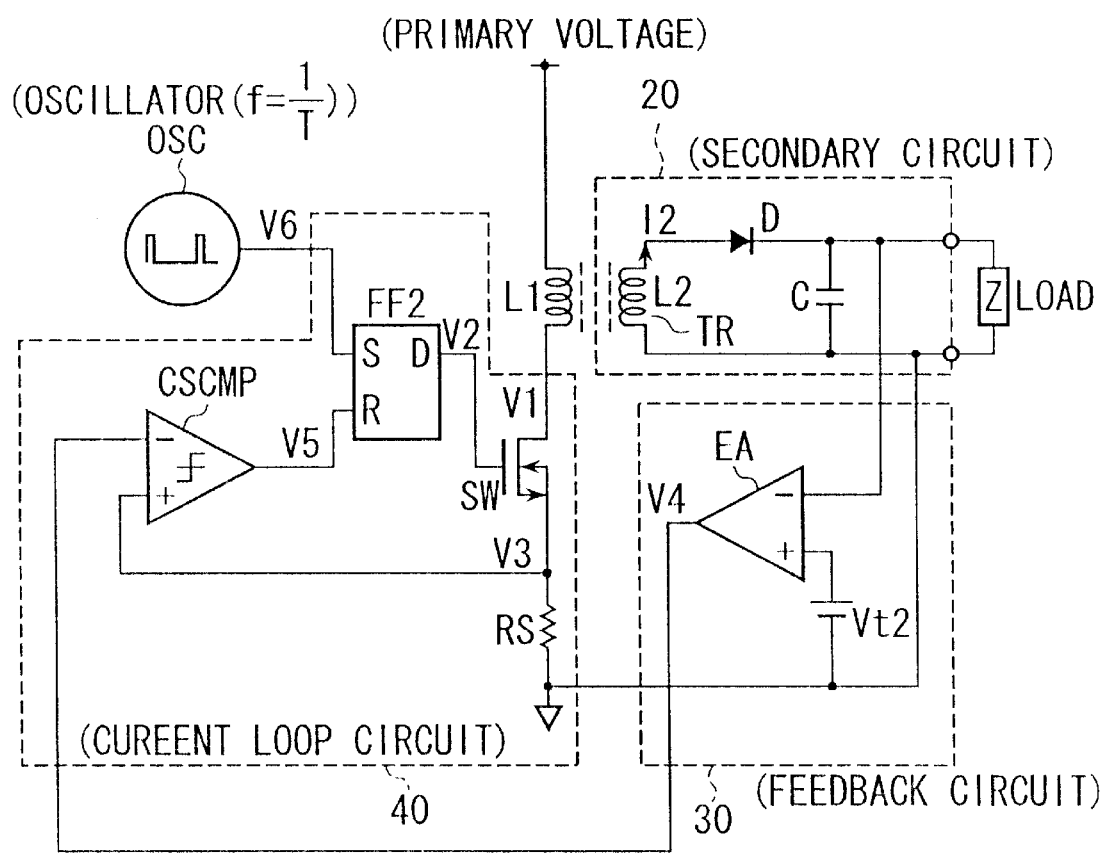
FIG. 3 is a diagram depicting another conventional switching power supply.
Figure 4:
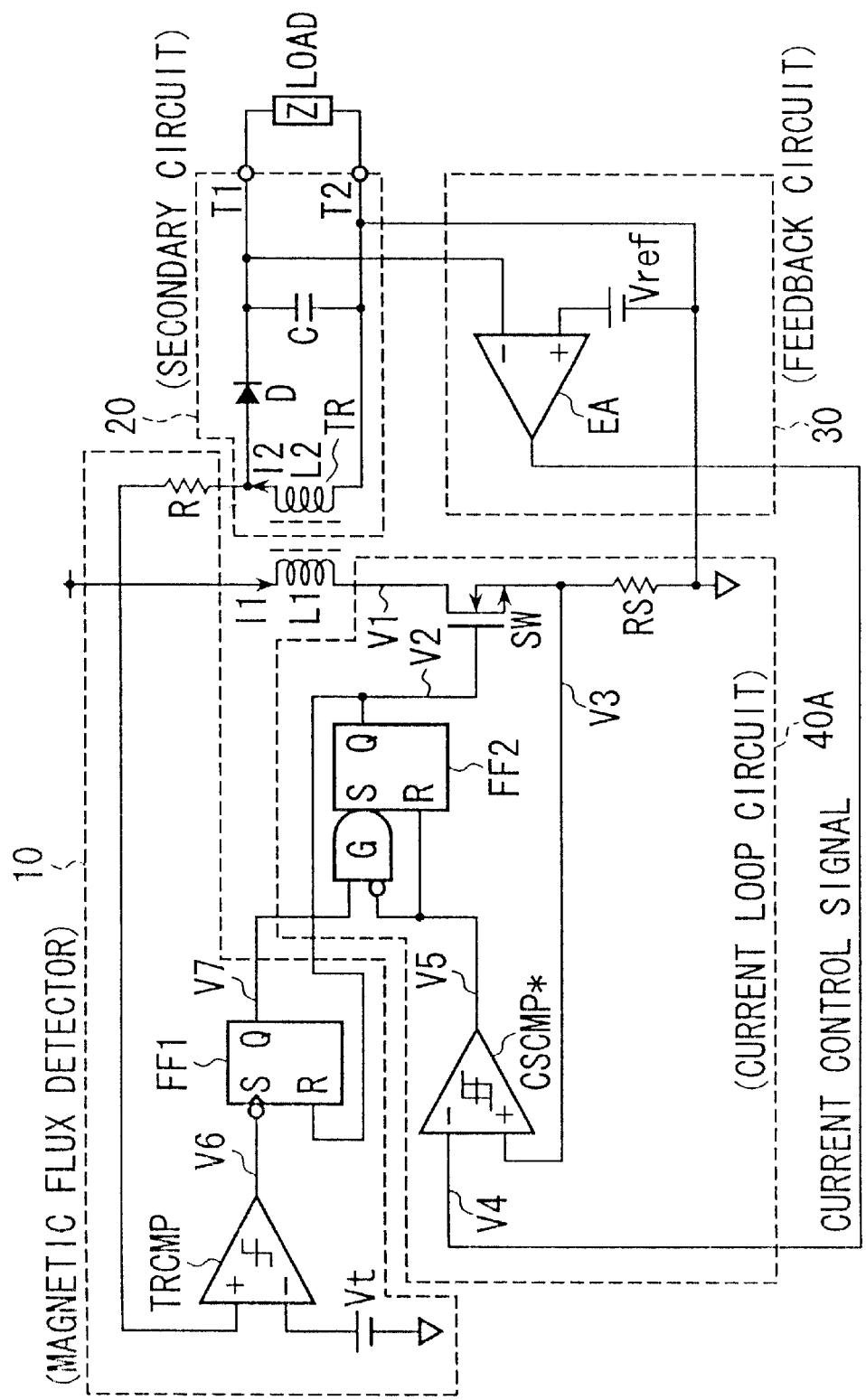
FIG. 4 is a diagram depicting an illustrative embodiment of the invention.

In the embodiment shown in FIG. 4, elements which are the same as those in FIGS. 1–3 have the same reference symbols and are not described hereat for sake of clarity of description. FIG. 4 shows a switching power supply provided with a gate G for receiving the output signal V7 from the first flip flop circuit FFL, to allow an input signal to be applied to the set input terminal S of FF2, to precede an input signal to be applied to the reset input terminal R of the second flip flop circuit FF2, and with a comparator CSCMP*, which has a hysteresis characteristic, as an alternaative to the second comparator CSCMP located in the current loop circuit 40 of FIG. 1, and in FIG. 4, shown in current loop circuit 40A.

With the use of the gate G in FIG. 4, as compared to lack of such gate in the conventional apparatus of FIG. 1, the reset input terminal R of the second flip flop circuit FF2 takes precedence whenever the set input terminal conflicts with the reset input terminal. Thus, the output Q of the second flip flop circuit FF2 always becomes low whenever there is a set-reset conflict.

Figure 5:
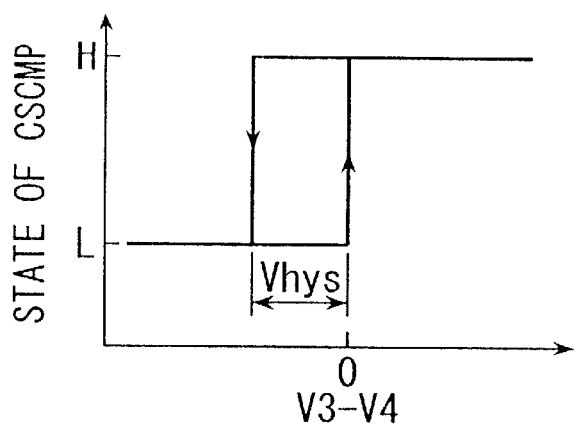
FIG. 5 is a graph depicting the hysteresis characteristics of the comparator used in the embodiment of FIG. 4.

FIG. 5 shows the hysteresis characteristic of the comparator CSCMP*, wherein the comparator CSCMP* operates in such a manner that: (a) The threshold follows the path (width=Vhys) on the right side of the figure when a differential voltage V3–V4, resulting from the difference between input V3 to the non-inverting input terminal (+) and an input V4 to an inverting input terminal (–), is caused to rise; and, on the other hand (b) The threshold follows the path (width= Vhys) on the left side of the figure when the differential voltage V3–V4 falls.

That is to say, the characteristics of the switching power supply is such that the comparator CSCMP* is provided a certain time lag by virtue of the hysteresis characteristics thereof, so that the output signal V5, being in a high state, is not immediately changed to a low state. Hence, the interval at which the switching device SW is turned ON and OFF is prolonged so as to suppress the oscillation frequency of the switching power supply.

Returning to FIG. 4, the switching power supply is designed to operate in two modes, one of which is normal operation and the other is burst operation with a small load or no load condition. The normal mode is no different from that of the conventional switching power supply described with reference to FIGS. 1 and 2. Thus, such a mode is excluded from the following, and only the "burst operation mode" is discussed hereat with reference to a small load condition and/or no load condition.

Figure 6:
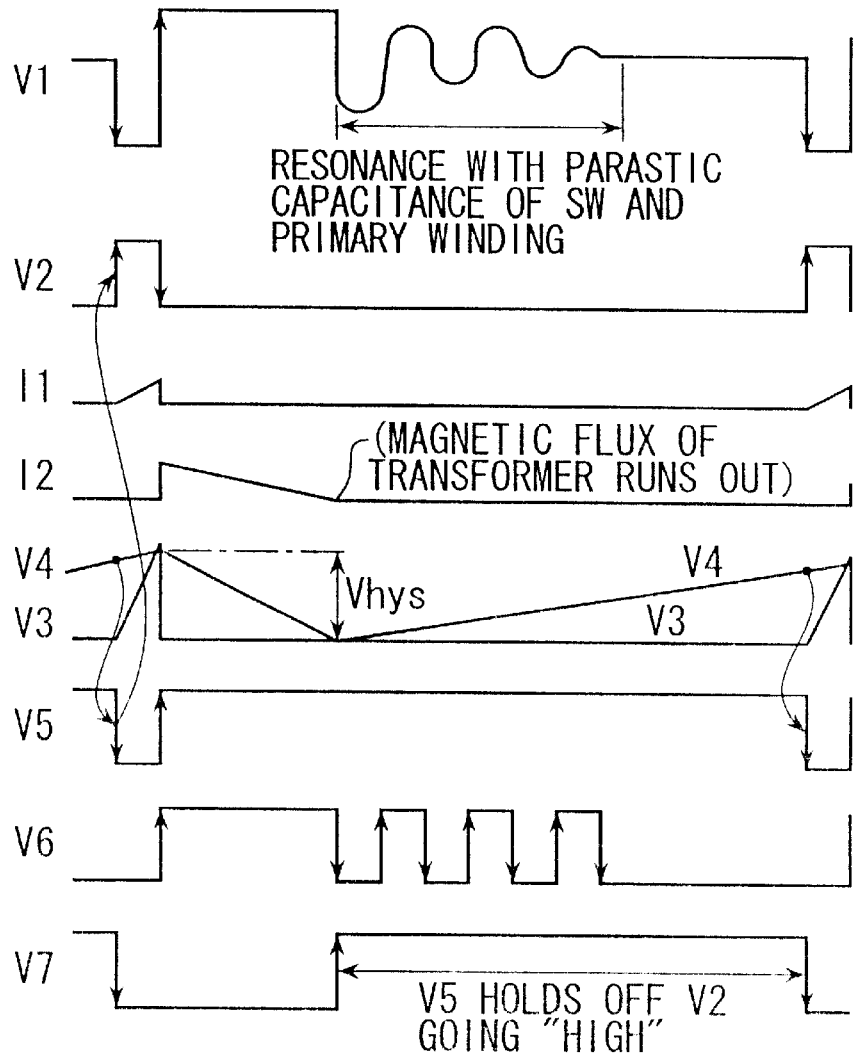
FIG. 6 is a timing chart depicting behavior of components of the embodiment of FIG. 4.

As shown in FIG. 6, the "burst operation" of the invention is similar to the conventional apparatus, only insofar as the transformer TR is energized by turning ON the switching device SW and then turned OFF to induce energy into the secondary circuit 20. On the other hand, the switching power supply of the invention differs from the conventional apparatus in that in the prior art, the ON stage period of the switching device SW begins immediately after the magnetic flux accumulated in the transformer TR becomes depleted. In contrast, in the instant invention, such as shown in FIG. 4, the time interval of the OFF to ON transition of the switching device SW is prolonged.

The reason for the prolongation of the transition period is as follows. The depletion of the magnetic flux in the transformer TR is detected and memorized by the magnetic flux detector 10, in an attempt to immediately turn ON the switching device SW by setting the second flip flop circuit FF2 through activation of the first flip flop circuit FF1. However, since the comparator CSCMP*, which has a hysteresis characteristic, continues to hold the output thereof high as long as the time required for the current control signal V4 to rise by as much as determined by the hysteresis width Vhys, the reset state of the second flip flop circuit FF2 is not cancelled for the reason of the action take by gate C. Hence, the output signal V2 of the second flip flop circuit FF2 remains high for a certain amount of time.

Figure 7:
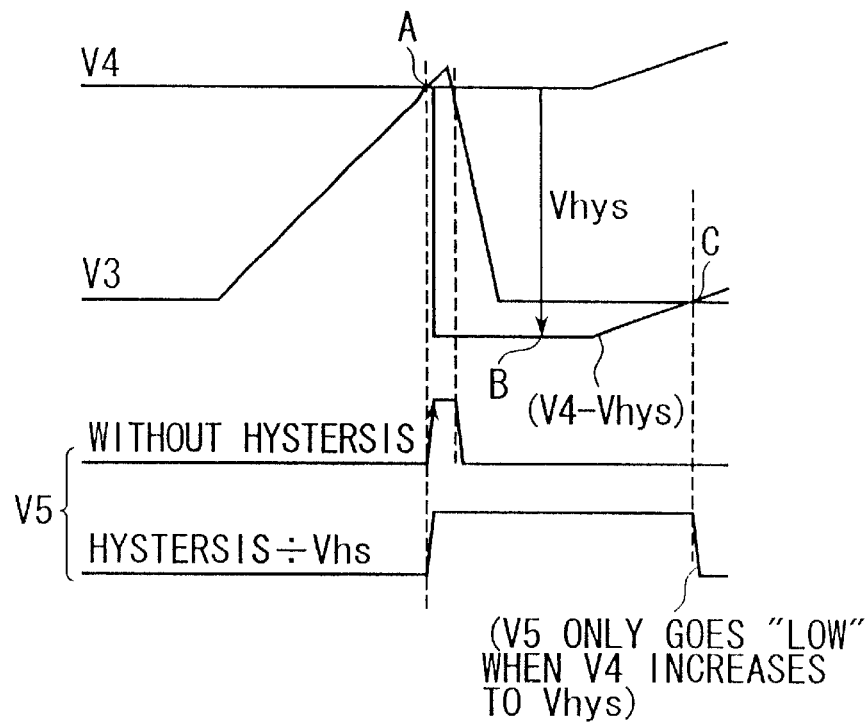
FIG. 7 is a graph depicting the difference between comparators having hysteresis characteristics and those not having hysteresis characteristics.

This means the threshold voltage V4 of the comparator CSCMP* is at a point A during the on state period of the switching device SW, as shown in FIG. 7. Hence, the reset signal V5 becomes high in the event that signal V3 becomes greater than the signal V4 (i.e. point A). Once the output signal V2 of the second flip flop circuit FF2 becomes low when the reset signal V5 changes the state, the switching device SW is turned OFF and the signal V3 is dropped rapidly. Thus, the reset signal V5 immediately becomes low, when the comparator CSCMP* has no hysteresis characteristic. On the other hand, when the comparator CSCMP* has a hysteresis characteristic, such as provided in the instant invention, the signal V5 does not return to a low state until signal V3 is less the signal V4 minus the signal Vhys, that is V3<(V4–Vhys) holds true, at point B. If the current control signal V4 is smaller than (V3+Vhys), the signal V5 remains high. Thus, the output signal V2 of the second flip flop circuit FF2 remains low. If this condition continues for a period of time, the voltage on the load side will fall, and the error amplifier EA will raise the level of the output signal thereof V4. Thus, the relationship between the input signals supplied to the comparator CSCMP* satisfies the condition V3<(V3+Vhys), at point C. This in turn causes cancellation of the reset signal V5 and allows the output from the second flip flop circuit FF2 to become low. However, since the set signal V7 of the first flip flop circuit FF1 is continuously applied even after the depletion of the magnetic flux in the transformer is detected, the output signal V2 of the second flip flop circuit FF2 is changed to a high state, thus bringing one cycle to an end.

The switching power supply of the invention is operated in a burst mode in which there is a short pause after the depletion of the magnetic flux in transformer TR. Hence, the operating frequency at which the switching device SW is turned ON and OFF is reduced. Also, there is no pulse signal produced for the levels of the current control signal that satisfy the condition V4<Vhys. This means continuous oscillation occurs only when the load is equal to or greater than the value that satisfies the condition V4=Vhys. Hence, an increase in the oscillation frequency under a small load condition and/or no load condition, is limited to values equal to or smaller than the value of the above load conditions.

Figure 8:
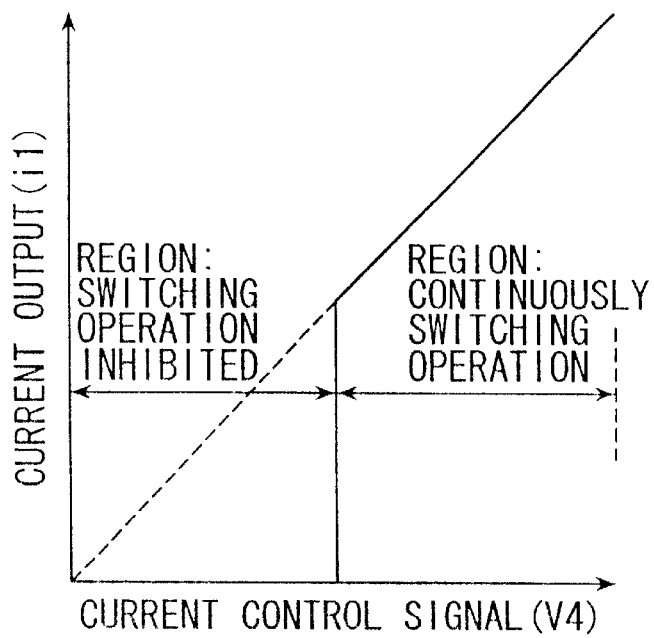
FIG. 8 is a graph depicting the relationship between a current control signal from an error amplifier and a current in the primary winding of the transformer.

FIG. 8 shows the relationship between the current control signal of the current loop circuit 40 and the current output per pulse. It is reasonable to conclude that a limit has been placed on the minimum value of the current output as a result of using the comparator CSCMP* having the hysteresis characteristic. This means the switching power supply of the invention is operated in such a manner that a current supplied to the load Z is regulated by thinning the density of the pulses, such as by means of negative feedback action under load conditions corresponding to values smaller than the minimum values, that is under a small load condition and/or no load condition. Also, continuous oscillation occurs only under a load condition corresponding to values greater than the minimum values. This means that limit has also been placed on the frequency increase.

Figure 9:
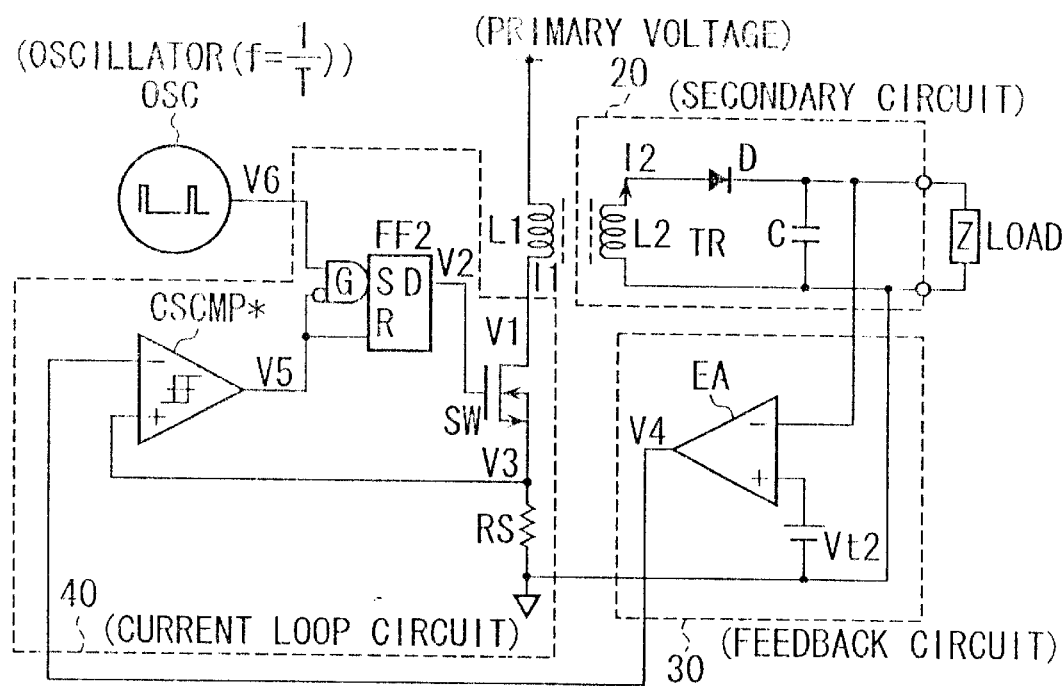
FIG. 9 is a diagram depicting another illustrative embodiment of the invention.

Moreover, in the embodiment of FIG. 9, wherein an oscillator OSC for producing a fixed frequency pulse signal (signal of high state pulses and low state pulses, or ON-OFF signals) is used in place of the magnetic flux detector 10 in FIG. 4, it is possible to obtain the same effects as obtained by the embodiment of FIG. 4. The embodiment of FIG. 9 is operated in the following manner, with reference to FIG. 10.

Figure 10:
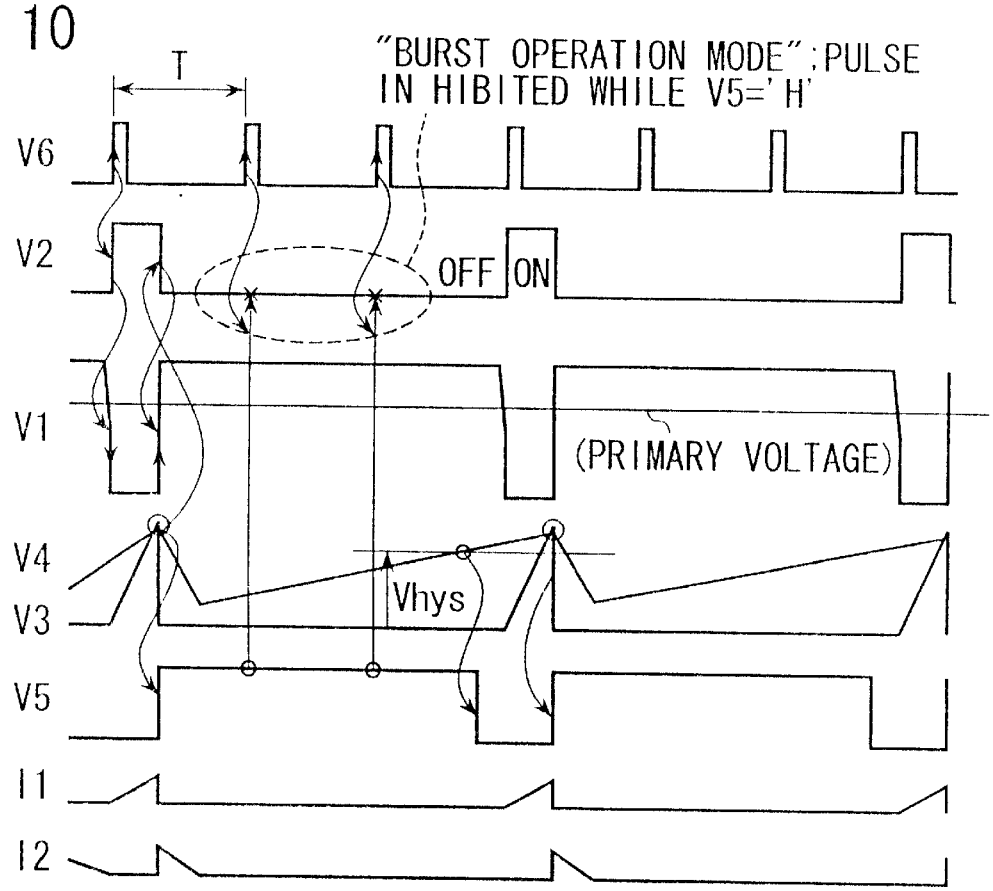
FIG. 10 is a timing chart depicting behavior of components of the embodiment of FIG. 9.

FIG. 10 is a timing chart illustrating the behavior of components shown in FIG. 9. The behavior is basically similar to that shown in the timing chart of FIG. 6. At a point A or B in FIG. 7, the voltage signal V5 is increased and the switching power supply is placed in a burst operation mode, thereby prohibiting the signal V2 from going high, that is provide an ON state.

The invention enjoys many advantageous features. For example, utilizing the comparator having the hysteresis characteristics in the current loop circuit, the amount of current that can be turned ON through the switching device is for values greater than the minimum value determined by the hysteresis. Hence, the maximum operating frequency is readily controllable. Another advantage is that by use of the feedback loop action to maintain equilibrium between the load current and the current transferred by the transformer, the switching power supply of the invention changes to the burst operation mode when there is only a small load condition and/or no load condition. Thus, with the instant invention, it is possible to readily decrease the frequency at which the switching device is turned ON and OFF.

Moreover, power losses in the components as a result of increase in oscillation frequency at which the switching device is turned ON and OFF is effectively reduced. The burst frequency, maximum oscillation frequency and points at which a transition is made to the burst operation mode is determined by the hysteresis characteristics. The power supply design can be simplified while maintaining design freedom.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A switching power supply apparatus comprising:

a switching device;

a transformer comprising a primary winding connected directly to said switching device and to which a DC current is applied by turning ON and OFF said switching device, and a secondary winding for supplying an output signal to a load;

control means connected to said secondary winding and comprising a first flip flop circuit connected to said switching device for turning ON and OFF said switching device, said switching device being turned ON by a control signal obtained from said output signal from said secondary winding, and said switching device being turned OFF by a control signal obtained from said output signal and a reference signal; and gate means connected to said first flip flop circuit of said control means for causing said control means to prolong time interval at which said switching means is turned ON and OFF so that oscillation frequency is suppressed.

2. The apparatus of claim 1, further comprising:

a first comparator means connected to said first flip flop circuit;

a second comparator means; and a second flip flop circuit connected to said second comparator means, wherein each of said first and second flip flop circuits comprises a set terminal, a reset terminal, and an output terminal; and wherein said gate means comprises:

a gate circuit connected to said set terminal of said first flip flop circuit and to said output terminal of said second flip flop circuit and furthermore connected to said first comparator means; and means for supplying to said gate circuit an inverted output signal from said second flip flop circuit and a signal associated with said output signal from said secondary winding, said signal being from said second comparator means, so that an input signal supplied to said reset terminal of said first flip flop circuit is given priority over an input signal supplied by said gate circuit to said set terminal of said first flip flop circuit.

3. A switching power supply apparatus comprising:

a switching device;

a transformer comprising a primary winding connected directly to said switching device and to which a DT, current is applied by turning ON and OFF said switching device, and a secondary winding which has an output signal induced therein which is supplied to a load;

a magnetic flux detector means for detecting magnetic flux induced at said secondary winding as said output signal and for outputting an ON state signal to said switching device when said output signal is smaller than a reference signal;

a feedback circuit means for comparing said output signal supplied to said load with a given voltage, and for feeding back difference therebetween as a current control signal;

a current loop circuit means connected to said switching device for performing ON and OFF control of said switching device according to an ON state signal outputted from said magnetic flux detector means and a current control signal outputted from said feedback circuit means;

first comparator means having a hysteresis characteristic for comparing said current control signal with a current flowing through said primary winding; and a precedence setting means comprising a flip flop circuit and connected thereto a gate circuit for establishing priority of signals used to control said switching device, wherein said ON state signal from said magnetic flux detector means is supplied to a set terminal of said flip flop circuit and an output signal from said first comparator means is supplied to a reset terminal of said flip flop circuit, whereby said reset input terminal is given priority over said set input terminal.

4. The apparatus of claim 3, further comprising means for supplying to said gate circuit, an inverted output signal from a second comparator means, and a signal from said first comparator means associated with said output signal from said secondary winding, and wherein an output signal from said gate circuit is supplied to said set terminal of said flip flop circuit and said output signal from said first comparator means is also supplied to said reset terminal of said flip flop circuit.

* * * * *